United States Patent [19]
Lee et al.

[11] Patent Number: 5,709,945
[45] Date of Patent: Jan. 20, 1998

[54] SPHERICAL HEAT STORAGE CAPSULE AND PROCESS FOR THE PREPARATION THEREOF

[75] Inventors: Hyeon Kook Lee; Jung Hwan Park; Oh Ryong Kwon; Joon Kim; Huk Nyun Kim, all of Daejeon, Rep. of Korea

[73] Assignee: Lucky Limited, Seoul, Rep. of Korea

[21] Appl. No.: 320,704

[22] Filed: Oct. 7, 1994

[30] Foreign Application Priority Data

Oct. 12, 1993 [KR] Rep. of Korea ............... 1993-21114

[51] Int. Cl.$^6$ ............... B32B 1/00; C09K 5/06
[52] U.S. Cl. ............... 428/403; 428/407; 165/104.17; 252/70; 252/71
[58] Field of Search ............... 428/402.2, 402.21, 428/402.22, 402.24, 403, 407; 165/10, 104.17, 902; 252/67, 70, 71, 73, 74

[56] References Cited

U.S. PATENT DOCUMENTS

| | | |
|---|---|---|
| 3,578,605 | 5/1971 | Baxter . |
| 3,623,997 | 11/1971 | Powell . |
| 4,268,558 | 5/1981 | Boardman ............... 428/71 |
| 4,513,053 | 4/1985 | Chen et al. ............... 428/221 |
| 4,747,240 | 5/1988 | Voisinet et al. . |
| 4,789,562 | 12/1988 | Stiffler ............... 427/221 |

Primary Examiner—Marie Yamnitzky
Attorney, Agent, or Firm—Anderson Kill & Olick, PC

[57] ABSTRACT

A spherical heat storage capsule having improved thermal properties includes a spherical core of a latent heat storage material having a diameter ranging from 0.1 to 10 mm, at least one layer of a hydrophobic wax and one to three layers of polymeric materials.

8 Claims, 6 Drawing Sheets

······ With a wax layer

——— Without a wax layer

SPHERICAL HEAT STORAGE CAPSULE AND PROCESS FOR THE PREPARATION THEREOF

FIELD OF THE INVENTION

The present invention relates to a heat storage capsule and a process for preparing same; and, more specifically, a heat storage capsule useful as building materials and in the manufacture of heat exchangers, and a process for preparing it by forming a sphere of heat storage material, which generates latent heat through phase changes, and coating the sphere with a wax and a polymeric material to prepare the heat storage capsule.

BACKGROUND OF THE INVENTION

Most substitute energy sources, e.g., solar energy, waste electrical or heat energies, are low level energies which are uneven and vary in terms of their quality and availability at a given time. In order to use such energies in the form of a higher energy which can be supplied in a steady and uniform manner, it is necessary to develop a method for storing the energies. Such methods are largely classified into two: one using sensible heat and the other using latent heat.

The sensible heat method which stores heat by employing, e.g., rocks and water, is widely practiced due to the low cost and abundant availability of the vehicle materials; however, there are disadvantages in that it needs a large amount of the heat storage materials and thus large spaces for accommodating them in order to store sufficient amounts of heat.

On the other hand, the latent heat method, which utilizes heat generated from a certain material undergoing phase changes, can store a greater amount of heat per unit weight or volume than the first method of using sensible heat.

The materials which may be used in the latent heat method (referred to as "phase change materials" or "latent heat storage materials" herein) should preferably possess a greater value of latent heat, the ability to perform endothermic and exothermic reactions at a desired temperature range, good heat transfer property, long-term stability and nontoxicity, and be corrosion resistant and low in cost.

Among various materials, inorganic hydrates, whose phase changes at a certain temperature, have been found to meet the above-mentioned conditions; and, therefore, attempts have been made to use these inorganic hydrates as latent heat storage materials. The inorganic hydrates, however, are physically and chemically unstable as they are vulnerable to heat reduction by the evaporation of hydrated water and increase in the melting point as well as phase separation and supercooling, which make it difficult to use them as the heat storage materials. To overcome these difficulties, therefore, there are needed various improvements including the enhancement of the thermal response of the inorganic hydrates.

Studies for encapsulating the latent heat storing inorganic hydrates have been made so as to solve such problems and improve the applicability of the inorganic hydrates.

For instance, a method for incorporating inorganic hydrates or organic latent heat storage materials into ordinary concrete or polymer-impregnated concrete has been attempted; however, the results have not been satisfactory due to the leakage of the heat storage materials, low affinity between the materials and concrete, and poor thermal response obtained (see, Brookhaven National Laboratory Report 50827, 1977/8–1978/2; Brookhaven National Laboratory Report 50896, 1978/3–1978/5). Also, U.S. Pat. No. 4,003,426 describes a method for encapsulating heat storage materials by dispersing them into a polymer and then copolymerizing same, which has seen only limited success.

In another prior art method, heat storage materials having a diameter of 1 inch or larger are jacketed with multilayer plastic/metal film composites, steel cans or polyolefin containers. This approach has not succeeded because of the poor thermal conductivity and physical and chemical unstability of the heat storage materials. Further, although heat storage systems containing microencapsulated wax as a heat storage material may solve some of the above-mentioned problems, the encapsulating process has proven to be too high in cost (see, NSF/RANN/SE/AE Report 74-09186, 1975/11; U.S. Pat. No. 4,513,053).

U.S. Pat. No. 4,513,053 discloses a process which comprises preparing a heat storage material in the form of a tablet with rounded edges and then encapsulating it with various polymeric materials. The resulting capsule has a shape similar to a cylinder with a longest dimension of from ⅛ to 1 inch and a shortest dimension of at least ⅛ inch and consists of six layers of polymeric coats, at least one of the layers containing a waterproof polymeric material. Although these capsules possess improved thermal response and mechanical strength, they also have the disadvantages that the cylindrical capsules have a smaller unit surface area than that of spherical capsules and thus the heat transfer thereof is worse than that of the latter. The spherical capsule exhibits the best heat storage efficiency and is easier to be applied into current heat storage systems compared with a cylindrical, helical coil or flat type capsule; and it is also easier to design the heat storage systems(see Saito and Hirose, Chem. Eng. Commun., 41, 39–58 (1986)). Further, in case that the capsule is not in the form of a sphere, several disadvantages arise: that is, even coating of the capsule is difficult, heat transfer through the capsule is not uniform, and the pressure which arises from the volume change upon phase-transition of the heat storage material is not uniform throughout the entire surface of the capsule. Moreover, coating of the six-layer structure is rather complicated and exacts a higher cost than that of a two to four-layer structure.

U.S. Pat. No. 4,708,812 describes the preparation of a spherical heat storage capsule having a diameter ranging from 0.05 to 10 mm in a similar manner to the microencapsulation; however, this method needs a very cold refrigerant, e.g., liquid nitrogen or dry ice, and melted inorganic hydrates should be added dropwise, which is inappropriate for a mass production system. Further, in order to solidify the melted hydrates by increasing its drop-path, the container of the refrigerants should be large in length; and, since this method utilizes an interfacial polymerization, only a limited number of polymers is available and the cost is too high. Also, these capsules normally have a single layer coating, which cannot provide the capsules with sufficient waterproof and mechanical strength.

In European Patent No. 076897, a method for casting inorganic hydrates into plastic cells having an inside volume of 100 cc or smaller and a size of several cm is disclosed. In this regard, however, Australian Patent No. 8660932, points out the poor productivity and high processing cost, and suggests that in order to overcome these problems, the particles coated with polymeric materials should be dispersed into a melted paraffine and then polymerized to prevent the agglomeration of the particles during the manufacturing process. Also, this method still has problems which occur in the course of interfacial polymerization. The resulting particles, incorporating the inorganic hydrate particles having a diameter ranging from 1.5 to 50 mm which are coated with a single layer of polymeric materials, also fail to produce sufficient waterproof effect and mechanical strength.

The Australian and European Patents show that, if the inside volume of the capsule or cell encapsulating the inorganic heat storage hydrates is 100 cc or smaller and the size thereof is up to several cm, the phase separation of the inorganic heat storage materials can be prevented.

Accordingly, in order to provide an ideal heat storage capsule, the heat storage materials, i.e., phase change materials, should be treated or coated to prevent the evaporation or reduction of water therein and exhibit sufficient mechanical strength. Further, the capsule should be spherically shaped for providing an improvement in the thermal response and facilitating the designing of the heat storage system, and should be small in volume and size for preventing its phase separation; and the process for its preparation should be simple, economic and suitable for mass production.

SUMMARY OF THE INVENTION

Accordingly, it is an object of the present invention to provide a spherical heat storage capsule which overcomes the above-mentioned problems present in the prior art systems and satisfies all of the desired conditions for an efficient heat storage material, while offering superior thermal response and mechanical strength.

It is another object of the present invention to provide a process for preparing the inventive spherical heat storage capsule having the superior thermal response and mechanical strength, which is simple, economic and adaptive for use in a mass production system.

In accordance with one aspect of the present invention, there is provided a spherical heat storage capsule having a diameter ranging from 0.3 to 11 mm, which comprises a spherical core of a latent heat storage material having a diameter ranging from 0.1 to 10 mm, at least one layer of a hydrophobic wax and one to three layers of polymeric materials.

In accordance with another aspect of the present invention, there is provided a process for preparing a spherical heat storage capsule having a diameter ranging from 0.3 to 11 mm, which comprises: forming, from a latent heat storage material, a solid sphere having a diameter ranging from 0.1 to 10 mm, and coating the resulting sphere to provide therewith at least one layer of a wax and one to three layers of polymeric materials.

DETAILED DESCRIPTION OF THE INVENTION

In accordance with the present invention, the use of a hydrophobic wax effectively prevents or minimizes the evaporation or reduction of water in the phase change material and provides excellent thermal response.

Figure 1:
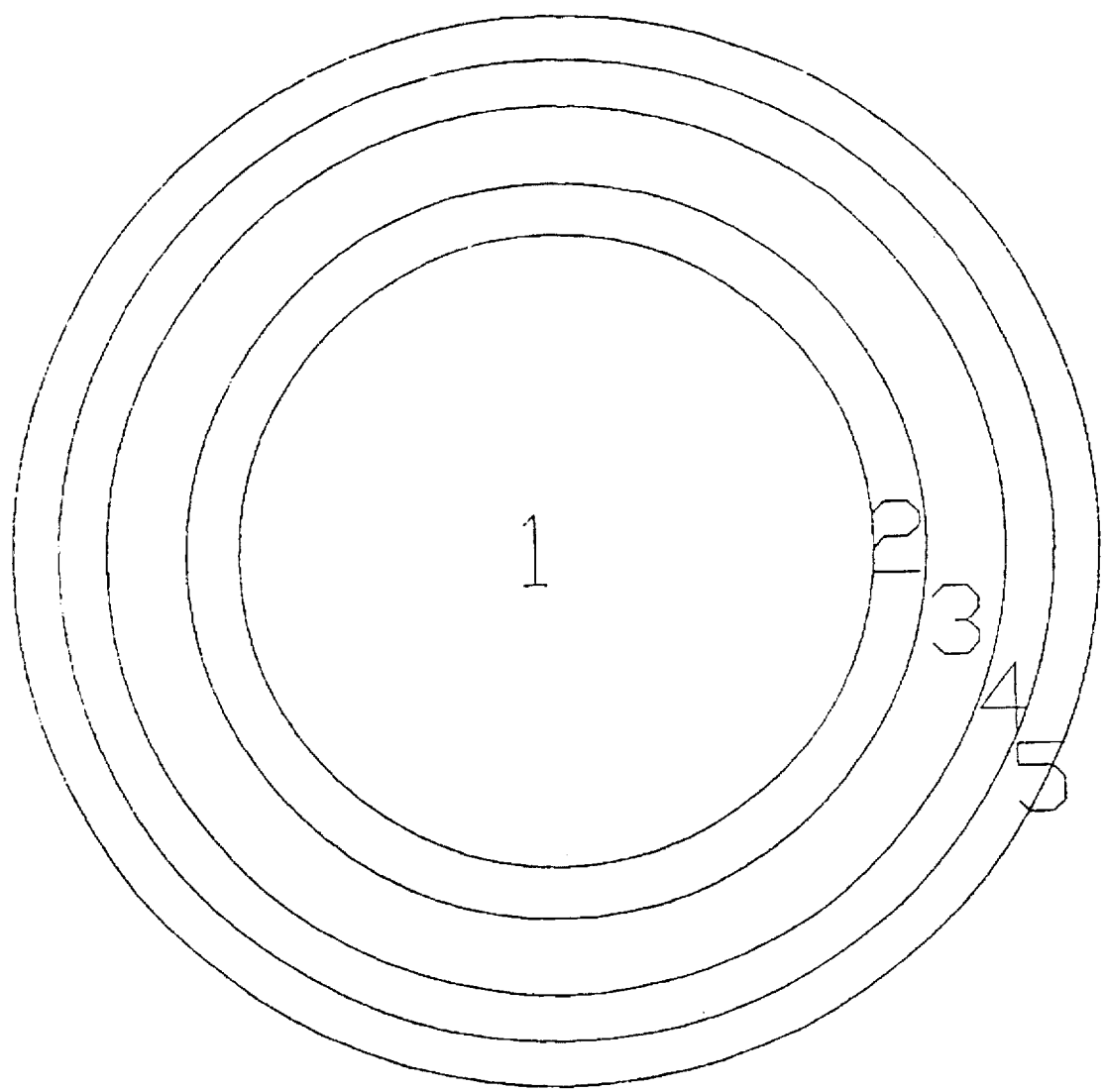
FIG. 1 shows an enlarged cross section of a spherical heat storage capsule of the present invention.

A schematic cross section of a coated spherical heat storage capsule prepared in accordance with the present invention is represented in FIG. 1. As shown, material 1 is a heat storing, phase change material having a diameter ranging from about 0.1 to 10 mm. The phase change material may be selected depending on the given application of the capsule, and may include at least one of inorganic or organic phase change materials.

Representatives of the inorganics are: sodium sulfate decahydrate, sodium thiosulfate pentahydrate, calcium chloride hexahydrate, magnesium nitrate hexahydrate, an eutectic mixture of magnesium nitrate hexahydrate and ammonium nitrate, potassium fluoride tetrahydrate, disodium hydrogen phosphate dodecahydrate, sodium acetate trihydrate, and an eutectic mixture of sodium acetate trihydrate and urea; and exemplary of the organics are paraffine wax and polyethylene glycol. Among these, sodium sulfate decahydrate, disodium hydrogen phosphate dodecahydrate, sodium acetate trihydrate and calcium chloride hexahydrate are preferred.

Preferably, additives such as a nucleating agent or a thickener may be added to the phase change material so as to enhance the heat storage effect. The nucleating agent may be borax, copper powder, sodium pyrophosphate decahydrate, trisodium phosphate dodecahydrate or strontium sulfate; and the thickener may be a cellulose derivative, acrylamide, acrylic derivative, chitin, casein, albumin, gelatin, polyvinyl alcohol, acrylate resin, activated clay, geolite or highly higroscopic resin.

The first step of the process for preparing the spherical heat storage capsule of the present invention lies in forming the phase change material, i.e., heat storage material, into a spherical form. In accordance with the present invention, the step can be conducted, for example, by one of the following three methods:

(A) continuously adding the phase change material in a liquid state dropwise into an organic solvent through a nozzle by pump, at a temperature below the melting point of the phase change material, to prepare a phase change material in the form of spheres; or (B) melting the phase change material, passing the liquid phase change material through a glass or metal pipe to give droplets having a diameter ranging from 4 to 10 mm, and continuously dropping the droplets into a refrigerant at a height of 30 cm or higher to collide the droplets with the refrigerant, thereby dividing each of the droplets into several smaller droplets to prepare a phase change material in the form of a solid sphere having a diameter ranging from 0.1 to 2 mm; or (C) melting the phase change material, passing the liquid phase change material through a glass or metal pipe to give droplets having a diameter ranging from 2 to 10 mm, and continuously dropping the droplets into a refrigerant at a height of 20 cm or below to prepare a phase change material in the form of solid spheres having a diameter ranging from 2 to 10 mm.

Figure 2:
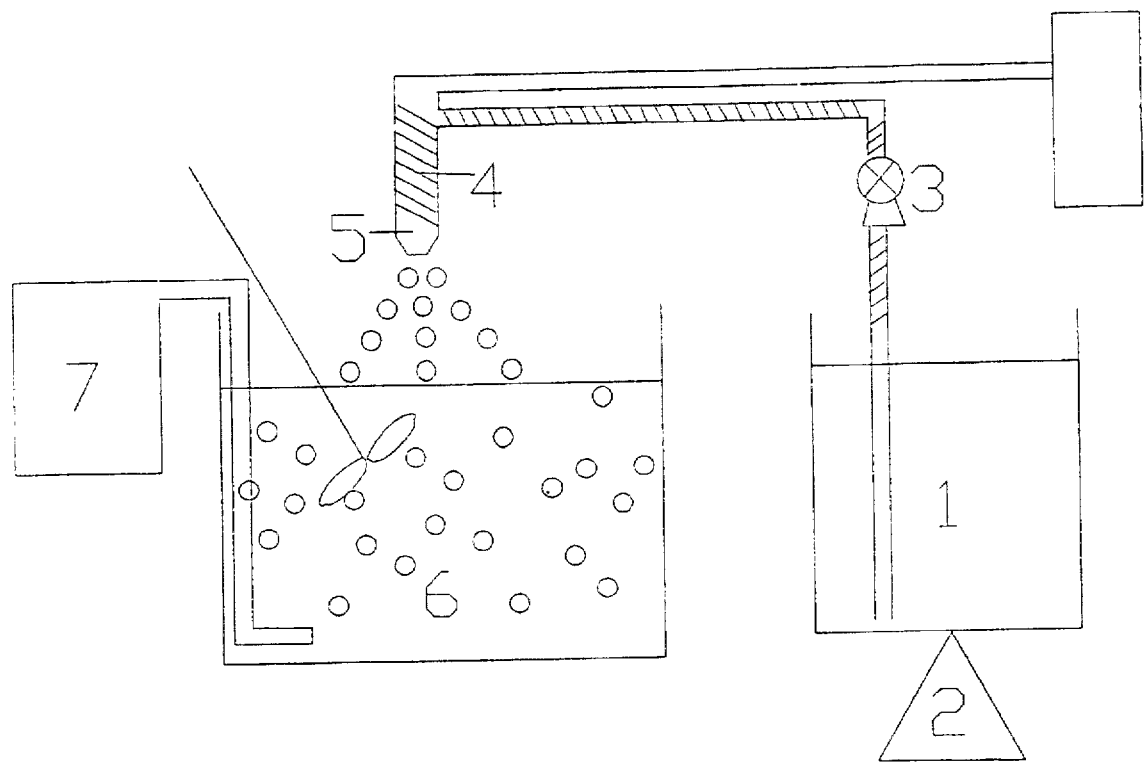
FIG. 2 illustrates schematically an apparatus for preparing the spherical heat storage materials in a solid state.

The schematic diagram shown in FIG. 2 represents a typical apparatus for preparing the heat storage materials in the form of spheres in accordance with the present invention. In FIG. 2, material 1 represents a phase change composition, i.e., a phase change material or a phase change material containing additives (referred to as the phase change composition herein) and is phase-changed from solid to liquid by a heating plate 2. If necessary, the composition may be stirred with a stirrer. Then, the liquid phase change composition is passed through a glass pipe, which is heated by a thermocouple or heat coil 4, to a nozzle 5 having a diameter ranging from 0.2 to 1 mm by pump 3, and dropped into an organic solvent 6 at a temperature lower than the melting point of the phase change composition to form solid spheres.

The organic solvent 6 may be any one of the known water-immiscible solvents such as chloroform, toluene, cyclohexane and n-hexane; and should have a surface tension smaller than that of the phase change composition. The organic solvent is selected according to the surface tension, density and solubility of the inorganic hydrate used and is preferably the one, having a lower specific gravity than that of the inorganic hydrate by about 0.1 to 0.5. If desired, a mixture of the above-described solvents may be used; and the temperature of the solvent may be reduced by employing dry ice or a refrigerator 7. Further, a stirrer may be used so as to reduce the time for cooling the droplets and increase the drop-path length thereof.

In general, the lower the temperature of the organic solvent is, the less voids the surface of the sphere has and the easier the subsequent coating process becomes. The voids which may occurr due to a volume shrinkage in the course of phase change may be plugged with wax coats with a thickness of 5 to 10 μm by spraying wax thereover in a fluidized bed machine. For this purpose, paraffine wax having a melting point ranging from 40° to 60° C. is dissolved into an organic solvent in a concentration ranging from 10 to 90% by weight. Coating is preferably conducted by using a tangential spraying method. The present inventive process has the advantages that the reduction in the volume of the phase change composition, which occurs upon phase change thereof from liquid to solid, can be prevented, since the melted phase change composition is solidified in the form of spheres from the outer surface as soon as it comes into contact with the refrigerant. That is, since the resulting sphere has a smooth surface and an inside maintaining its original volume with a sufficient space, the capsule can be prevented from breakage which often occurs due to an expansion of the phase change composition upon melting at the operating temperature. The size of the solid sphere of the phase change composition is preferably 0.1 to 10 mm and is selected depending on the flow rate and surface tension of the phase change composition, nozzle diameter and flow rate of the spraying gas, and therefore the size can be adjusted within the preferred range by controlling these parameters. Further, stirring of the organic solvent with a stirrer lengthens the drop-path of the droplet, shortens the cooling time, thereby gives uniform dispersion of the solidified materials thereinto.

The solid spherical phase change composition may be dried at a temperature ranging from 0° C. to 30° C. depending upon the melting point of the composition and the evaporation temperature and evaporation heat of the organic solvent, then selected to an adequate size by sieving, and sealed in a plastic bag and scored until subsequent coating.

The spherical phase change composition prepared in accordance with the present invention has the advantage that its tight surface prevents the evaporation of water, thereby preventing the change of the spherical composition until subsequent coating. Further, the present inventive process uses a nozzle and is less limited by the solvent and temperature than a conventional emulsion or dispersion method, and can produce a large amount of solid spheres from the phase change composition.

In order to provide the heat storage capsule with a desired level of mechanical strength, the spherical phase change composition is coated with one to three layers of polymeric materials which may be same or different.

In FIG. 1, layer 2 is a first coating layer comprising a polymeric material, and, if necessary, may be omitted. Said layer 2 serves as a primer to facilitate the coating of a hydrophobic wax layer, a second coating layer, and enhances the mechanical strength to prevent a volume change in the phase change composition. Thus, the layer 2 has a relatively thin thickness ranging from 10 to 100 μm. The polymer which may be used in forming the layer 2 includes those which can be dissolved in an organic solvent such as resins from styrene acryl, vinylidene chloride copolymer, shellac, isobutylene, polycarbonate and amide, and particularily vinylidene chloride copolymer.

Coating of the phase change composition with the polymer may be conducted as follows:

The polymer, e.g., resins from styrene acryl, vinylidene chloride copolymer, shellac, isobutylene, polycarbonate and amide, is dissolved in an appropriate solvent, e.g., toluene, chloroform, tetrahydrofuran or methyl alcohol. The solvent and the concentration of the polymer therein are selected based on the polymer to be incorporated, the desired coating thickness, the operating temperature and the like. A suitable concentration of the polymer in the solution may range from about 5 to 15% by weight. Then, the polymer solution is sprayed on the surface of the spheres made from the phase change composition on a fluidized bed through a nozzle. The temperature of the fluidized bed is preferably kept lower than the melting point of the phase change composition and controlled depending upon the evaporation rate of the organic solvent in the polymer solution. The polymer is solidified by the evaporation of the solvent to form a film layer on the solid spheres of the phase change composition. The speed of spraying is also controlled depending upon the evaporation rate of the organic solvent which is spread on the surface of the phase change composition spheres, resulting in a smooth coating.

Layer 3 in FIG. 1, a second coating layer, is of a hydrophobic wax, and serves to prevent the release of crystallization water in the heat storage capsule. The water or vapor transmittancy of wax is zero, and thus wax can prevent completely the evaporation and reduction of water. Representative of the hydrophobic waxes which may be used include: paraffine wax, Brazil wax, beeswax, polyethyene wax, microcrystalline wax and polyglycolated saturated glyceride. Each of these waxes should have a melting point higher than that of the phase change composition and than the operating temperature of the heat storage capsule so that it always maintains the solid state throughout the process. If wax is melted, the phase change material of high density becomes settled, and, thus, it cannot envelope and protect the phase change material upon resolidifying.

The method for coating the phase change composition with a wax may be the same as the case with a polymer coating in layer 2, except that instead of the polymer, wax is dissolved in the solvent. The thickness of the layer 3 may range from 100 to 300 μm depending on the application, and the concentration of wax in the solvent may range from 5 to 30% by weight depending on the coating thickness, solubility of wax and the spreadability thereof on the sphere surface.

Layer 4 in FIG. 1 is a third coating layer comprising a polymer, which is necessary for the enhancement of the mechanical strength of the heat storage capsule. The polymer to be used may be selected, depending on the required mechanical strength, from the resins of styrene, acryl, vinylidene chloride copolymer, shellac, isobutylene, polycarbonate and amide. The thickness of the layer may range from 50 to 200 µm, and the coating process may be the same as that used in forming the first coating layer.

In FIG. 1, layer 5 is a final coating layer comprising a curable polymer, which may be omitted, if desired. This layer can be used to provide the heat storage capsule with high mechanical strength and chemical and physical stability and to control the surface properties for improving the affinity thereof which may be need in its combination with another material. The coating method may be the same as that of other polymer coating layers except that the polymer is cured in the layer 5. The thickness of this coating layer may range from 10 to 50 µm. The polymer which may be used is a curable polymer at room temperature and includes an urethane resin, epoxy resin and phenol resin. A prepolymer is first dissolved in an organic solvent, e.g., toluene, chloroform, tetrahydrofuran or methyl alcohol, and the resulting solution is coated on the spheres of the phase change composition on a fluidized bed. Then, the temperature of the fluidized bed or the flow rate of a spraying gas employed is increased to accelerate the curing of the coating.

The heat storage capsule prepared in accordance with the present invention is in the form of a solid sphere having a diameter ranging from about 0.3 to 11 mm; and it possesses excellent thermal response and is free of phase separation in the phase change material, supercooling and weight reduction problems caused by evaporation of water. The heat storage capsule of the present invention has several advantages in that since it replaces the conventional sensible heat storage system, it reduces the required space and simplifies the design of the heat storage system. More importantly, the capsules can be dispersed into such heat transfer materials as water or ethylene glycol and used as a building material admixed with cement, concrete or mortar, as a heat insulating material, and in the manufacture of winter clothes and shoes, etc.

The following Examples are intended to illustrate the present invention more specifically, without limiting the scope of the invention.

Preparation of Spherical Heat Storage Material

PREPARATIVE EXAMPLES 1-1 to 1-6

Preparation of the Heat Storage Materials by Method A

Sodium acetate trihydrate, disodium hydrogen phosphate dodecahydrate, sodium sulfate decahydrate, sodium thiosulfate pentahydrate or sodium acetate trihydrate-urea eutectic mixture containing a thickener and nucleating agent specified in Table I in an amount of 2% by weight based on the weight of the inorganic hydrate, respectively, or sodium carbonate decahydrate was melted and passed through a nozzle to produce droplets. The size of the droplet was controlled by adjusting the flow rate of the spraying gas. Then, these droplets were sprayed into organic solvents at relatively low temperature with stirring at 50 to 200 rpm to prepare solid spherical inorganic hydrates having a diameter ranging from 0.1 to 3 mm.

The heat storage material and the organic solvent which are employed in each Preparative Examples, and the amount and temperature of the solvent are summarized in Table I.

TABLE I

| Prep. Ex. | Heat Storage Material | Organic Solvent (% by volume) | | Temp. of Organic Solvent (°C.) | Nucleating Agent | Thickener |
| --- | --- | --- | --- | --- | --- | --- |
| | | Chloroform | Toluene | | | |
| 1-1 | sodium acetate trihydrate | 45 to 55 | 45 to 50 | −60—−20 | sodium pyrophosphate decahydrate | gelatin |
| 1-2 | disodium hydrogen phosphate dodecahydate | 40 to 60 | 40 to 60 | −60—−10 | copper powder (10 µm) | sodium polyacrylate |
| 1-3 | sodium sulfate decahydrate | 40 to 60 | 40 to 60 | −60—−10 | borax | sodium polyacrylate |
| 1-4 | sodium thiosulfate pentahydrate | 100 | 0 | −60—−10 | strontium sulfate | gelatin |
| 1-5 | sodium carbonate decahydrate | 40 to 60 | 40 to 60 | −60—−10 | — | — |
| 1-6 | sodium acetate trihydrate-urea eutectic mixture | 50 | 50 | −60—−10 | sodium pyrophosphate decahydrate | gelatin |

PREPARATIVE EXAMPLES 2-1 to 2-5

Preparation of the Heat Storage Materials by Method B

Sodium acetate trihydrate, disodium hydrogen phosphate dodecahydrate, sodium sulfate decahydrate or sodium thiosulfate pentahydrate containing a thickener and nucleating agent specified in Table II in an amount of 2% by weight based on the weight of the inorganic hydrate, respectively, or sodium carbonate decahydrate was melted and passed through a glass or metal pipe to give droplets having a diameter ranging from 4 to 10 mm. Then, the resulting droplets were dropped into organic solvents at a low temperature with stirring at 100 to 400 rpm at a height of 30 cm or higher to provide smaller solid droplets having a diameter ranging from 0.1 to 2 mm.

The heat storage material and the organic solvent which are employed in each Preparative Examples, and the amount and temperature of the solvent are summarized in Table II.

TABLE II

| Prep. Ex. | Heat Storage material | Organic Solvent (% by volume) chloroform | Toluene | Temp of Organic Solvent (°C.) | Nucleating Agent | Thickener |
|---|---|---|---|---|---|---|
| 2-1 | sodium acetate trihydrate | 35 to 55 | 45 to 50 | −60—−40 | sodium pyrophosphate decahydrate | gelatin |
| 2-2 | disodium hydrogen phosphate dodecahydate | 30 to 60 | 40 to 70 | −60—−20 | copper powder (10 μm) | sodium poly-acrylate |
| 2-3 | sodium sulfate decahydrate | 30 to 60 | 40 to 70 | −60—−20 | borax | sodium poly-acrylate |
| 2-4 | sodium thiosulfate pentahydrate | 100 | 0 | −60—−30 | strontium sulfate | gelatin |
| 2-5 | sodium carbonate decahydrate | 40 to 60 | 40 to 60 | −60—−20 | — | — |

PREPARATIVE EXAMPLES 3-1 to 3-4

Preparation of the Heat Storoge Materials by Method C

Sodium acetate trihydrate, disodium hydrogen phosphate dodecahydrate, sodium sulfate decahydrate, or sodium thiosulfate pentahydrate containing a thickener or nucleating agent specified in Table III in an amount of 2% by weight based on the weight of the inorganic hydrate, respectively, was melted and passed through a glass or metal pipe to give droplets having a diameter ranging from 2 to 10 mm. Then, the resulting droplets were dropped into organic solvents at a low temperature with stirring at 100 to 400 rpm at a height of 20 cm or below to prepare a solid sphere of each of the inorganic hydrates, having a diameter ranging from 2 to 10 mm.

The heat storage material and the organic solvent which are employed in each Preparative Examples, and the amount and temperature of the solvent are summarized in Table III.

Preparation of Heat Storage Capsule

EXAMPLE 1

The spherical disodium hydrogen phosphate dodecahydrate containing 2% by weight of copper powder, which was prepared in the above preparative example 2-2, was coated with paraffine wax of a melting point ranging from 40° to 60° C. dissolved in toluene in a concentration of 10 to 90% by weight, in 5 μm thickness in a fluidized bed machine (GPCG-1, Glatt in Germany). Then, the sphere coated with paraffine was sequently coated with a polymethyl methacrylate resin and shellac in 50 μm thickness, with paraffine wax having a melting point of 55° C. in 200 μm thickness, and then with a polymethyl methacrylate resin or styrene resin in 100 μm thickness to prepare a spherical heat storage capsule.

In this example, each coating process was conducted by tangential spraying method.

EXAMPLE 2

The spherical sodium decahydrate containing 2% by weight of borax, which was prepared in the above prepara-

TABLE III

| Prep. Ex. | Heat Storage Material | Organic Solvent (% by volume) Chloroform | Toluene | Temp of Organic Solvent (°C.) | Nucleating Agent | Thickener |
|---|---|---|---|---|---|---|
| 3-1 | sodium acetate trihydrate | 45 to 55 | 45 to 50 | −60—−20 | sodium pyrophosphate decahydrate | gelatin |
| 3-2 | disodium hydrogen phosphate dodecahydate | 40 to 60 | 40 to 60 | −60—−10 | copper powder (10 μm) | sodium poly-acrylate |
| 3-3 | sodium sulfate decahydrate | 40 to 60 | 40 to 60 | −60—−10 | borax | sodium poly-acylate |
| 3-4 | sodium thiosulfate pentahydrate | 100 | 0 | −60—−10 | strontium sulfate | gelatin | tive example 1-3, was coated with paraffine wax of a melting point ranging from 40° to 60° C. dissolved in toluene in a concentration of 10 to 90% by weight, in 5 μm thickness in a fluidized bed machine (GPCG-1, Glatt in Germany). Then, the sphere coated with paraffine was sequently coated with a polymethyl methacrylate resin in 100 μm thickness, with paraffine wax having a melting point of 50° C. in 200 μm thickness, and then with styrene, a polymethyl methacrylate resin or vinylidene chloride copolymeric resin in 100 μm thickness to prepare a spherical heat storage capsule.

In this example, each coating process was conducted by tangential spraying method.

EXAMPLE 3

The spherical sodium pentahydrate containing 2% by weight of strontium sulfate, which was prepared in the above preparative example 2-4, was coated with paraffine wax of a melting point ranging from 40° to 60° C. dissolved in toluene in a concentration of 10 to 90% by weight, in 5 μm thickness in a fluidized bed machine (GPCG-1, Glatt in Germany). Then, the sphere coated with paraffine was sequently coated with a polymethyl methacrylate resin in 50 μm thickness, with paraffine wax having a melting point of 70° C. or Brazil wax having a melting point of 80° C. in 200 μm thickness, and then with styrene, a polymethyl methacrylate resin or vinylidene chloride copolymeric resin in 100 μm thickness. The resulting sphere was coated with a 19:7 mixture of 2,4,6-Tris-dimethyl aminomethyl phenol (K-54, Lucky Limited in Korea) as a curing agent and epoxy resin (LER-1050-75X, Lucky Limited in Korea), which was then cured at room temperature in 20 μm thickness to prepare a spherical heat storage capsule.

In this example, each coating process was conducted by tangential spraying method.

EXAMPLE 4

The spherical sodium acetate trihydrate containing 2% by weight of sodium pyrophosphate decahydrate, which was prepared in the above preparative example 3-1, was coated with paraffine wax of a melting point ranging from 40° to 60° C. dissolved in toluene solvent in a concentration of 10 to 90% by weight, in 5 μm thickness in a fluidized bed machine (GPCG-1, Glatt in Germany). Then, the sphere coated with paraffine was sequently coated with polymethyl methacrylate resin in 50 μm thickness, with paraffine wax having a melting point of 70° C. or Brazil wax having a melting point of 80° C. in 200 μm thickness, and then with a polystyrene, polymethyl methacrylate resin or vinylidene chloride copolymeric resin in 100 μm thickness to prepare a spherical heat storage capsule.

In this example, each coating process was conducted by tangential spraying method.

EXAMPLE 5

The spherical sodium carbonate decahydrate, which was prepared in the above preparative example 2-5, was coated with paraffine wax of a melting point ranging from 40° to 60° C. dissolved in toluene in a concentration of 10 to 90% by weight, in 5 μm thickness in a fluidized bed machine (GPCG-1, Glatt in Germany). Then, the sphere coated with paraffine was sequently coated with a polymethyl methacrylate resin in 100 μm thickness, with paraffine wax having a melting point of 50° C. in 150 μm thickness, and then with styrene, a polymethyl methacrylate resin or vinylidene chloride copolymeric resin in 100 μm thickness to prepare a spherical heat storage capsule.

In this example, each coating process was conducted by tangential spraying method.

EXAMPLE 6

The spherical sodium acetate trihydrate-urea eutectic mixture containing 2% by weight of sodium pyrophosphate decahydrate, which was prepared in the above preparative example 1-6, was coated with paraffine wax of a melting point ranging from 40° to 60° C. dissolved in toluene in a concentration of 10 to 90%, in 5 μm thickness in a fluidized bed machine (GPCG-1, Glatt in Germany). Then, the sphere coated with paraffine was sequently coated with a polymethyl methacrylate resin in 100 μm thickness, with paraffine wax having a melting point of 50° C. in 200 μm thickness, and then with styrene, a polymethyl methacrylate resin or vinylidene chloride copolymeric resin in 100 μm thickness to prepare a spherical heat storage capsule.

In this example, each coating process was conducted by tangential spraying method.

Thermal Property Test

Figure 3:
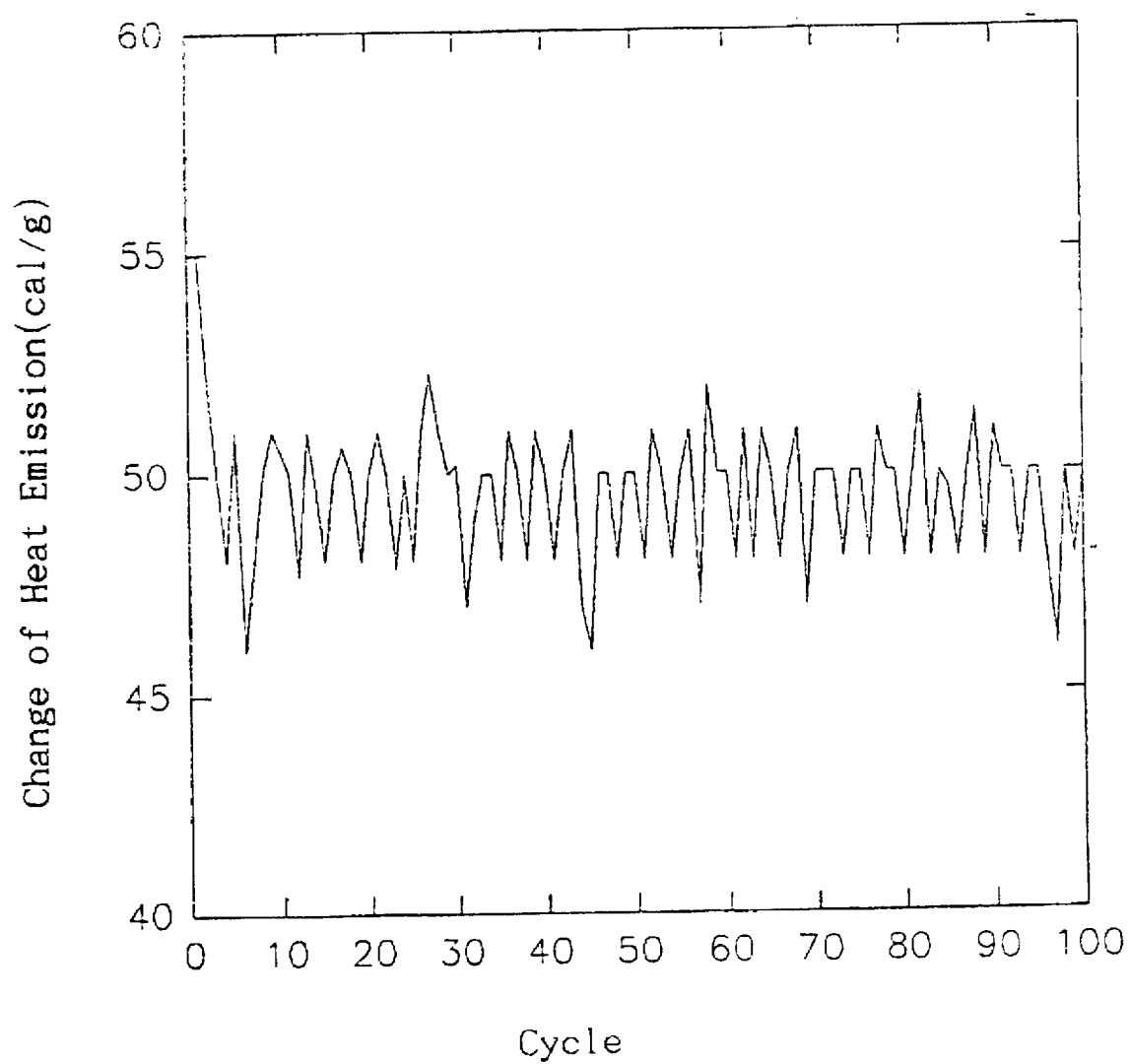
FIGS. 3 and 4 are graphs depicting the change in heat emission by the heat storage capsules prepared in accordance with the present invention, which is measured by a differential scanning calorimetry.
Figure 4:
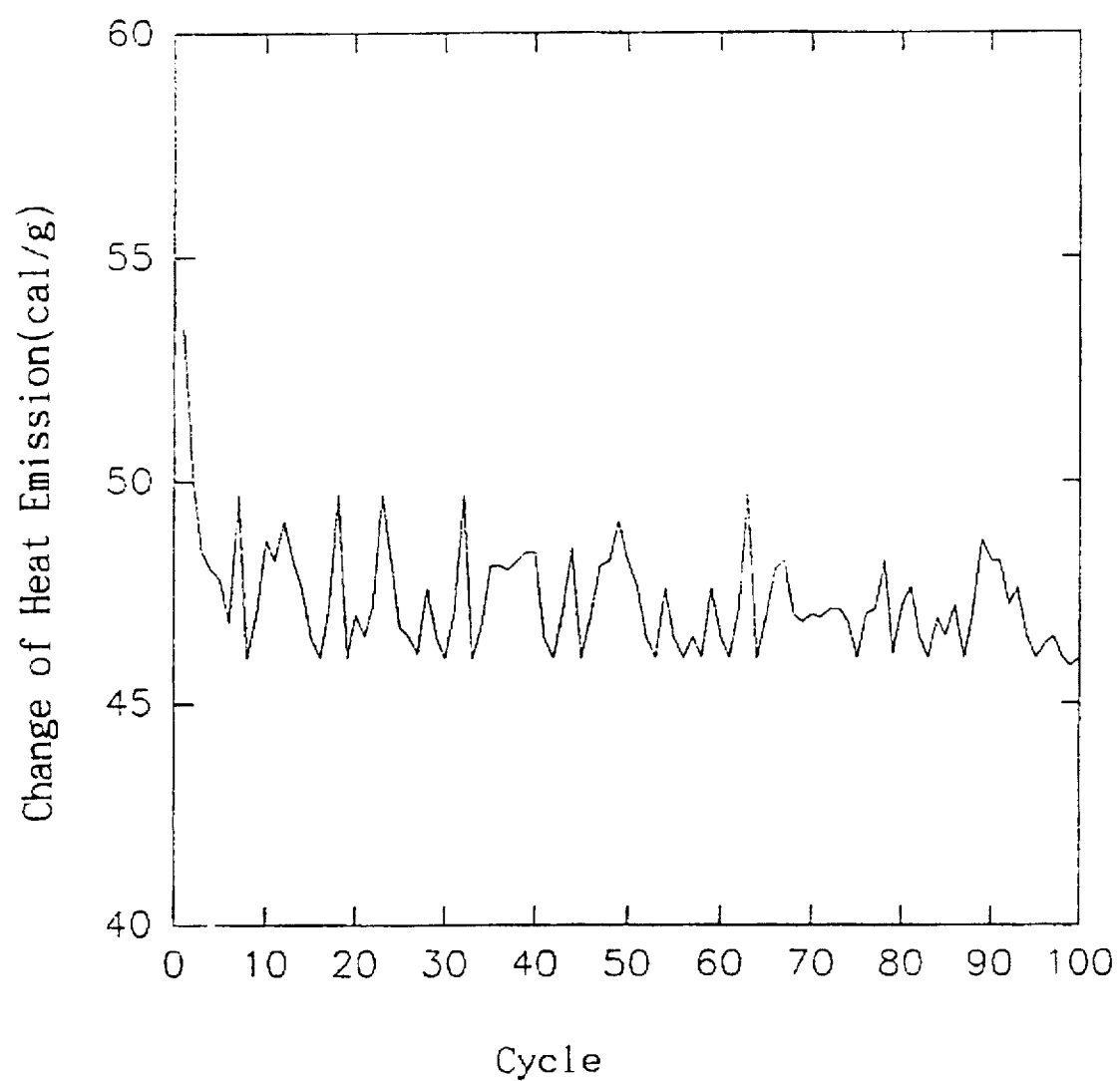

Each of the heat storage capsules, prepared in the above Examples 1 and 4, was subjected a repetitive heating and cooling of 100 times, and the change of heat emission was evaluated by using a differential scanning calorimeter (DSC220, Seiko in Japan). The results are presented in FIGS. 3 and 4, respectively. The average heat emission was about 50 cal/g and about 48 cal/g, respectively, and the exothermic temperature was constant, about 30° C. and 50° C., respectively.

Effect of Wax Coating Layer

Figure 5:
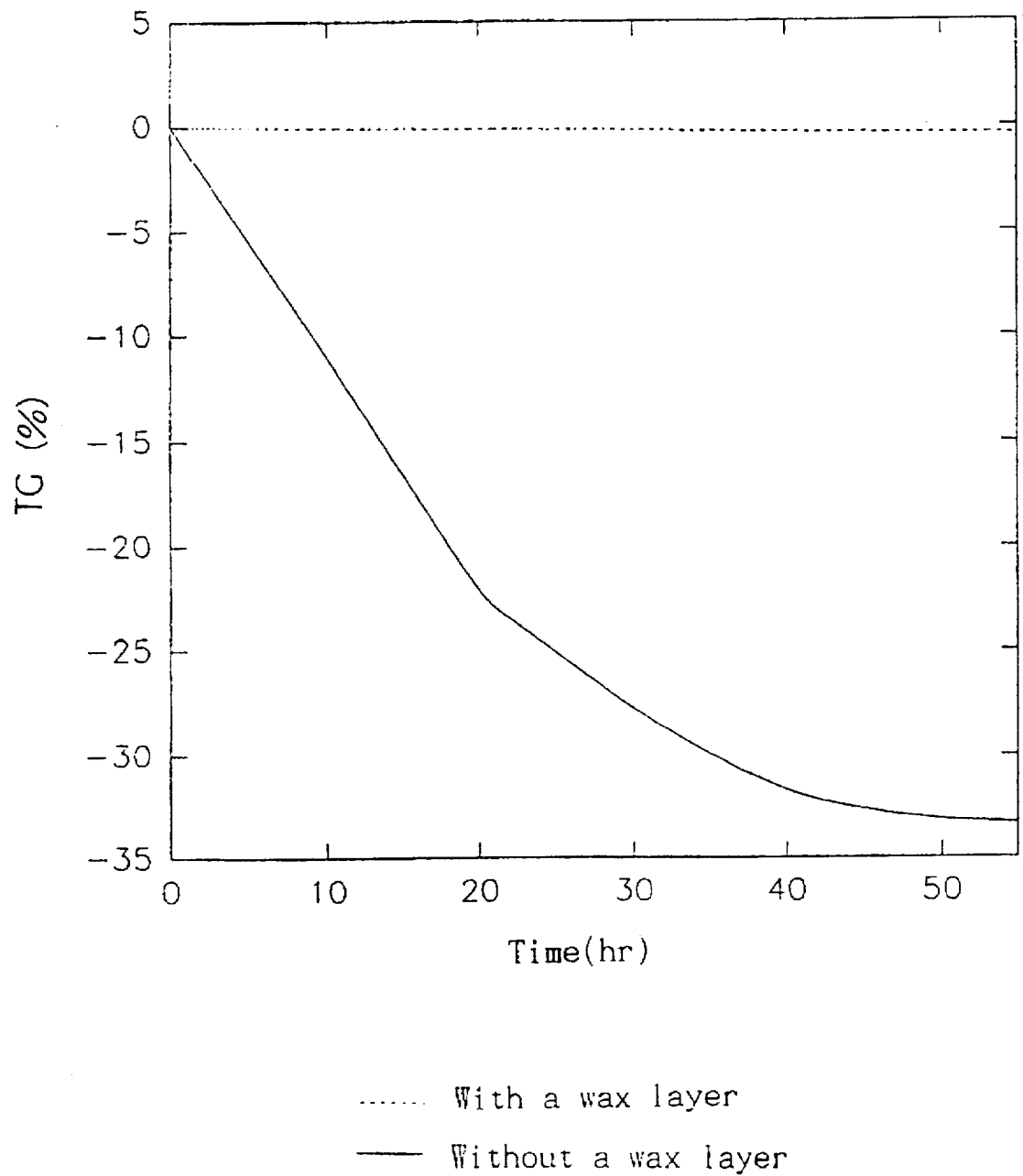
FIGS. 5 and 6 demonstrate the relase of hydrated water in each of the capsules with and without a wax coating layer.
Figure 6:
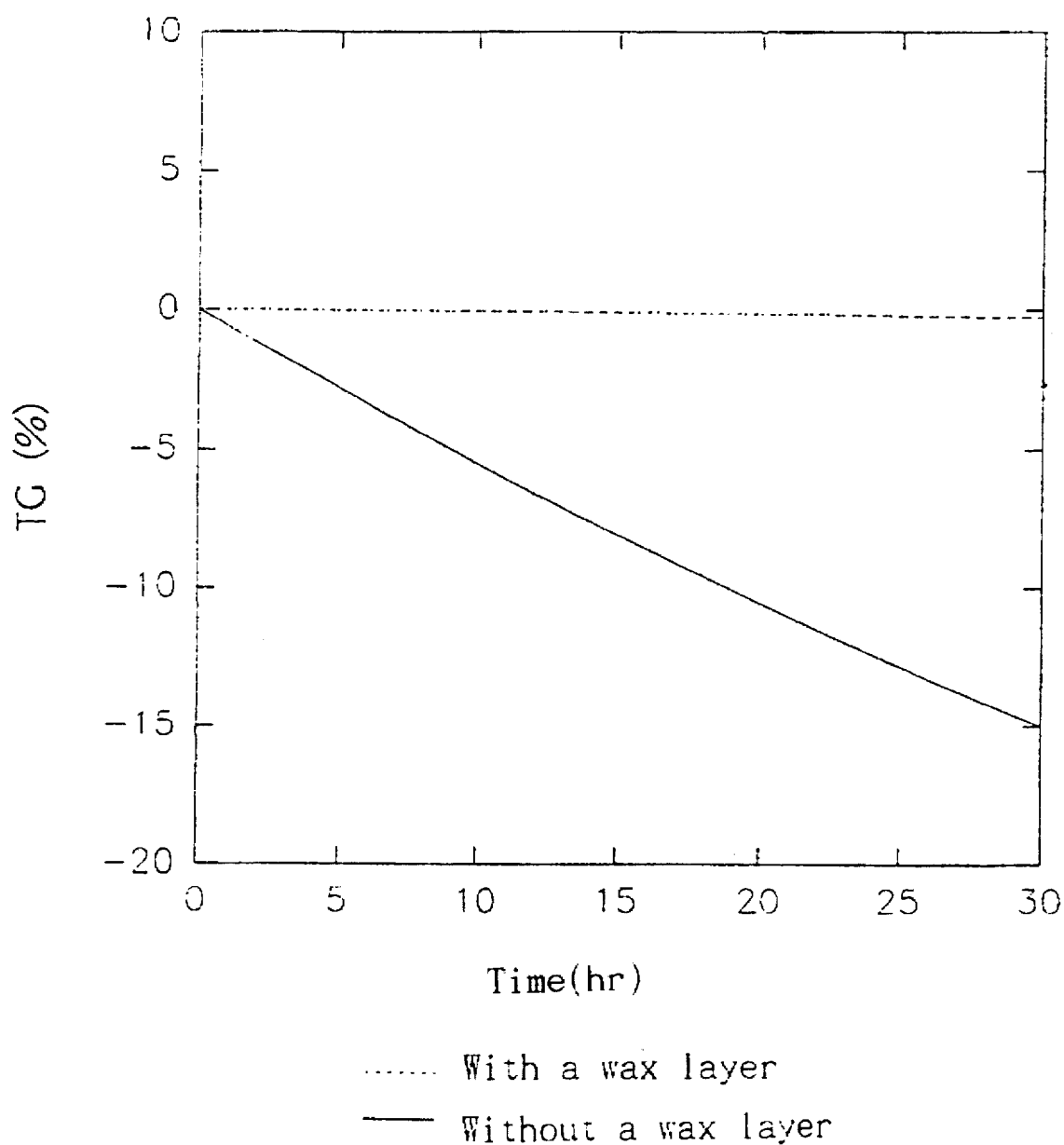

The degree of release of crystallization water of each of the heat storage capsules with a paraffine or Brazil wax coating layer, prepared in Examples 1 and 4, was compared with those without wax coating layer by using a differential thermal analyzer (TG/DTA 320, Seiko in Japan) at 50° C. and 70° C., respectively. The results are presented in FIGS. 5 and 6, respectively. As shown from the results, the degree of release of crystallization water of the capsule with wax coating layer was close to zero, whereas that of the capsule with only polymer coating layer was relatively high.

Property on Sonication

The heat storage capsules, prepared in Examples 1 and 4, were sonicated with a sonicator (BRANSON 3200, Branson in U.S.A.) in water at 25° C. and 40° C., respectively, for one hour and the inside of each treated capsule was observed with a microscope. The result shows that, the heat storage material of the present invention exhibits no changes.

Further, each of the heat storage capsules with and without a paraffine wax layer were sonicated in water at 25° C. The results in the course of time are presented in Table IV.

TABLE IV

| Time (min) | With paraffine wax layer | Without paraffine wax layer |
| --- | --- | --- |
| 15 | ○ | ○ |
| 30 | ○ | Δ |
| 60 | ○ | x |

○: no changes on the inner heat storage material.
Δ: some changes on the inner heat storage material.
x: considerable changes on the inner heat storage material.

As shown from the results of the above tests, the spherical heat storage capsule of the present invention, which comprises a spherical heat storage material and one or more hydrophobic wax and polymer coating layers, exhibits excellent thermal property, low degree of release of crystallization water of the heat storage material and improved strength. Therefore, in accordance with the present invention, by forming the heat storage material into a sphere and then coating it with one or more wax layers, the heat storage capsule having outstandingly improved thermal response and mechanical strength compared to those of the heat storage capsule without wax coating layer can be prepared.

While the present invention has been described with respect to certain preferred embodiments only, other modifications and variations may be made without departing from the scope of the present invention as set forth in the following claims.

What is claimed is:

1. A spherical heat storage capsule having a diameter ranging from 0.3 to 11 mm, which comprises a spherical core of a latent heat storage material having a diameter ranging from 0.1 to 10 mm, at least one layer of a hydrophobic wax, and one to three layers of polymeric materials, wherein the melting point of the wax is higher than that of the latent heat storage material and higher than any temperature at which the storage capsule operates, wherein at least one layer of polymeric material is exterior to the at least one layer of hydrophobic wax and the heat storage material is selected from the group consisting of sodium sulfate decahydrate, sodium thiosulfate pentahydrate, calcium chloride hexahydrate, magnesium nitrate hexahydrate-ammonium nitrate eutectic mixture, potassium fluoride tetrahydrate, disodium hydrogen phosphate dodecahydrate, sodium acetate trihydrate, sodium acetate trihydrate-urea eutectic mixture, and a mixture thereof.

2. The heat storage capsule of claim 1, which comprises in the order of the spherical core of the latent heat storage material, a first polymer coating layer, a second wax coating layer, a third polymer coating layer and a fourth polymer coating layer.

3. The heat storage capsule of claim 2, wherein said first polymer coating layer has a thickness ranging from 10 to 100 µm; and the polymer is a resin selected from the group consisting of styrene, acryl, vinylidene chloride copolymer, shellac, isobutylene, polycarbonate and amide resins.

4. The heat storage capsule of claim 2, wherein said second wax coating layer has a thickness ranging from 100 to 300 µm; and the wax is selected from the group consisting of hydrophobic paraffine wax, Brazil wax, beeswax, polyethylene wax, microcrystalline wax and polyglycolated saturated glyceride.

5. The heat storage capsule of claim 2, wherein said third polymer coating layer has a thickness ranging from 50 to 200 µm; and the polymer is a resin selected from the group consisting of styrene, acryl, polyvinylidene chloride copolymer, shellac, isobutylene, polycarbonate and amide resins.

6. The heat storage capsule of claim 2, wherein said fourth polymer coating layer has a thickness ranging from 10 to 50 µm; and the polymer is a curable polymeric resin selected from the group consisting of urethane, epoxy, silicon and phenol resins.

7. The heat storage capsule of claim 1, wherein said spherical core contains at least one thickener selected from the group consisting of a cellulose, acrylamide, chitin casein, albumin, gelatin, polyvinyl alcohol, acrylate resin, activated clay, zeolite and hygroscopic resin.

8. The heat storage capsule of claim 1, wherein said spherical core contains at least one nucleating agent selected from the group consisting of borax, copper powder, sodium pyrophosphate decahydrate, trisodium phosphate dodecahydrate and strontium sulfate.

\* \* \* \* \*